United States Patent [19]
Johnson

[11] 3,985,064
[45] Oct. 12, 1976

[54] DEVICE FOR DISPLACEABLY SUPPORTING A LOAD
[76] Inventor: Lars Johnson, Backegardsgatan 20, S-415 06 Goteborg, Sweden
[22] Filed: May 19, 1975
[21] Appl. No.: 578,417

Related U.S. Application Data
[63] Continuation of Ser. No. 395,580, Sept. 10, 1973, abandoned.

[52] U.S. Cl. .......................... 91/413; 91/170 MP; 92/48; 92/64; 92/92; 198/630
[51] Int. Cl.² ...................... F15B 11/22; F15B 13/00
[58] Field of Search ................... 92/48, 64, 92, 99; 91/170 MP, 413; 198/1, 108

[56] References Cited
UNITED STATES PATENTS
| | | | |
|---|---|---|---|
| 2,392,279 | 1/1946 | Woods | 92/48 X |
| 3,327,832 | 6/1967 | Kyle | 198/1 |
| 3,413,856 | 12/1968 | Lombardi | 92/92 X |
| 3,417,942 | 12/1968 | Van Alstyne | 92/92 X |
| 3,543,907 | 12/1970 | Pool et al. | 198/1 |
| 3,785,567 | 1/1974 | Fisher | 92/48 X |
| 3,848,541 | 11/1974 | Hondzinski | 198/1 X |

FOREIGN PATENTS OR APPLICATIONS
882,958   7/1953   Germany ................ 92/48
1,103,851   3/1961   Germany ................ 198/1

Primary Examiner—Martin P. Schwadron
Assistant Examiner—Abraham Hershkovitz
Attorney, Agent, or Firm—Albert L. Jeffers; Roger M. Rickert

[57] ABSTRACT

A device for displaceably supporting a body in relation to a support surface comprising at least two elastic elements positionable between the support surface and a surface of the body and separately expansible and contractible in a direction towards and from the support surface and the body surface and means for alternately expanding and contracting the elastic elements, the elastic elements thereby being alternately loaded by and unloaded from the weight of the body, the body being displaceable substantially parallel with the support surface by means of elastic shearing in the elastic element at the moment loaded by and supporting the body, and the means for expanding and contracting the elements being adapted to contract and unload the loaded element after a predetermined deformation thereof and to expanse the other element to a loaded position, the unloaded element thereby elastically resuming its non-deformed position.

6 Claims, 10 Drawing Figures

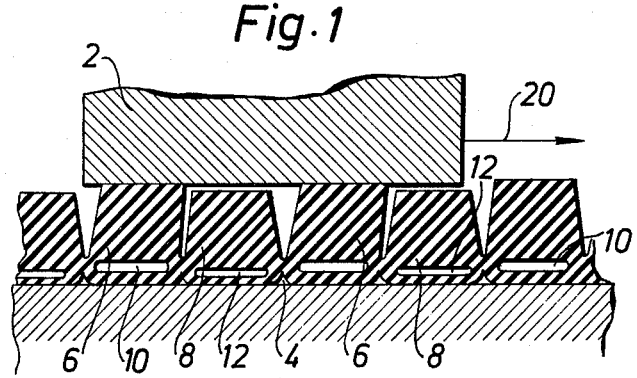
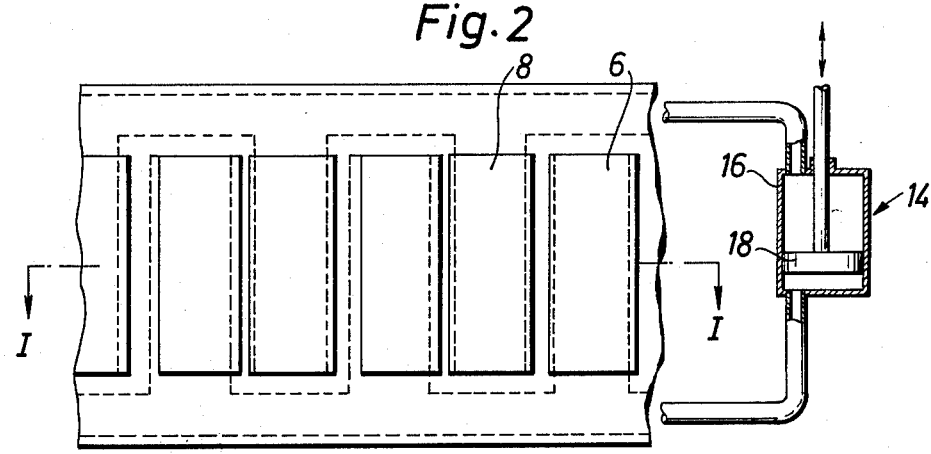
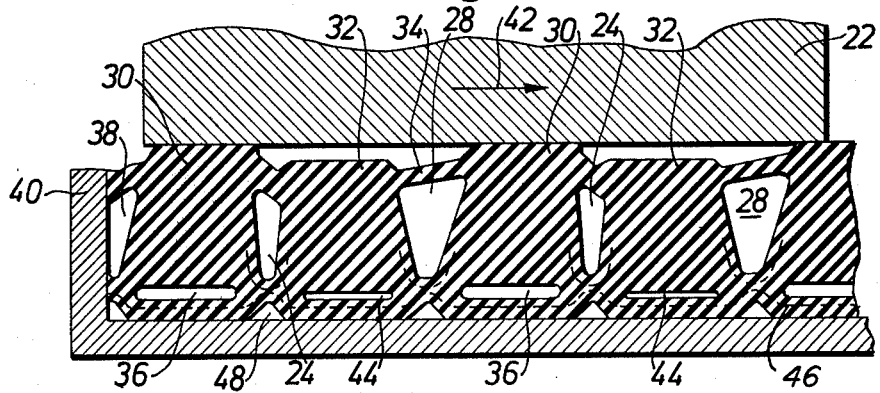

DEVICE FOR DISPLACEABLY SUPPORTING A LOAD

BACKGROUND OF THE INVENTION

This is a continuation application of Ser. No. 395,580 filed on Sept. 10, 1973 and now abandoned.

The present invention relates to a device for displaceably supporting a body in relation to a support surface.

A device for displaceably supporting a body previously known consists of a rod or a band subjected to bending, the ends of the rod or band being rigidly attached to the support surface and the body, respectively. A supporting device of this kind provides for a displaceability which is limited by the permissible bending stress which is a substantial drawback.

Another device for displaceably supporting a body comprises elastically bendable elements providing for a stepwise displacement of the body. By means of devices previously known the body cannot be displaced parallel with the support surface. The fact that the body rests on a rigid support when the elastic elements return to their un-bent position in devices of this kind also provides for a varying speed during the displacement.

The object of the present invention is to provide a device for displaceably supporting a body which does not have these drawbacks.

SUMMARY OF THE INVENTION

In accordance with the invention there is provided a device for displaceably supporting a body in relation to a support surface comprising at least two elastic elements positionable between the support surface and a surface of the body and separately expansible and contractible in a direction towards and from the support surface and the body surface and means for alternately expansing and contracting the elastic elements, the elastic elements thereby being alternately loaded by and unloaded from the weight of the body, the body being displaceable substantially parallel with the support surface by means of elastic shearing in the elastic element at the moment loaded by and supporting the body, and the means for expansing and contracting the elements being adapted to contract and unload the loaded element after a pedetermined deformation thereof and to expanse the other element to a loaded position, the unloaded element thereby elastically resuming its non-deformed position.

By means of a device in accordance with the invention it is possible to provide a continuous parallel displacement of the body in relation to the support surface by the fact that the elastic deformations take place in two or more elements alternately taking up the load and the elastic displacements.

Different embodiments of the invention are described in the following with reference to the accompanying drawings.

BRIEF DESCRIPTION OF THE DRAWINGS

FIG. 1 is a section of an embodiment of a device in accordance with the invention along line 1—1 in FIG. 2;

FIG. 2 is a plan view showing the device of FIG. 1;

FIG. 3 is partial section of a second embodiment of the invention;

DESCRIPTION OF THE PREFERRED EMBODIMENT

Figure 4:
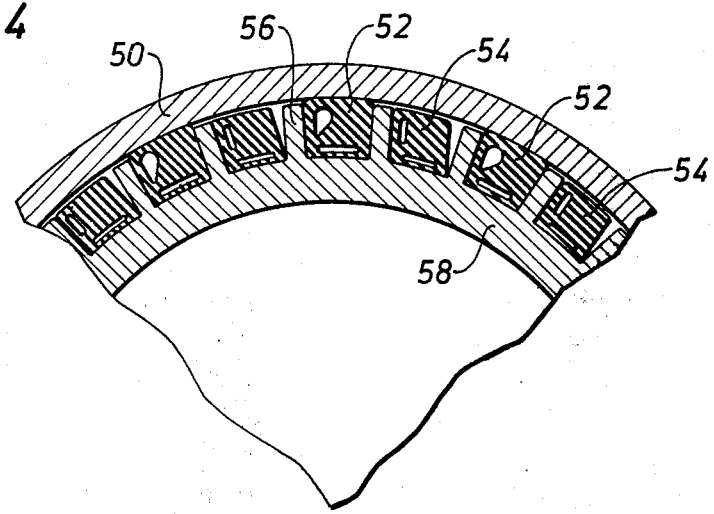
FIG. 4 is partial section of an alternative embodiment of the invention.

In FIGS. 1 and 2 there is shown a supporting device for displaceably supporting a body 2 in relation to a support surface 4. The device consists of several elastic, longitudinal elements 6 and 8 connected with each other at the lower side edges for constituting a continuous carpet. At its lower portion the elements are formed with channels 10 and 12 extending along the elements and closed at their ends. The elements 6 and 8 can be raised by supplying a pressure fluid to the channels 10 and 12. The channels 10 and 12 are connected with a pressure fluid source, in the embodiment shown in FIGS. 1 and 2 constituted by a piston-cylinder-device 14. The elements 6 are connected with one end of the cylinder 16, and the elements 8 are connected with the other end of the cylinder. When the piston 18 is displaced in the cylinder the channels of one group of elements are supplied with pressure fluid for raising the corresponding elements whereas the pressure of the fluid in the channels of the other group of elements is relieved for lowering the corresponding elastic elements. The body 2 rests on the elements raised by having their channels supplied with pressure medium, and in the position shown in FIG. 1 the elements 6 support the body 2. In this position the body 2 can be displaced without any greater amount of elastic friction by exerting an external force on the body in parallel with the support surface 2. This force is represented by the arrow 20. When the elastic deformation which comprises shearing movements in the loaded elastic elements reaches a suitable value the pressure fluid is supplied to the channels 12 of the elastic elements 8, the elements 8 thereby being raised for taking over the load from elements 6 which are lowered by relieving the pressure from the channels 10. By not relieving the pressure in the channels 10 until the elements have taken over the load the level of the body can be kept constant. When the elements 6 have been lowered out of contact with the body the elements 6 elastically restore to a non-deformed shape.

The carpet constituted by the elastic elements can be used for displaceably supporting any type of goods, containers, crates and the like.

In the embodiment of the device according to FIG. 3 a displacement of the body 22 can be provided without exerting any external force on the body 22. In this device pressure channels 24 and 28 are positioned at the side of every elastic element 30 and 32, as shown in FIG. 3. The channels 24, 28 are enclosed partly by the elastic elements 30 and 32, and partly by an elastic wall 34 connecting the elastic elements. In the position shown pressure fluid has been introduced into the channels 36, 28 and a channel 38 placed against a stop element 40. The elements 30 which carry the load thereby have displaced the body 22 in the direction of the arrow 42 in FIG. 3. During the next phase pressure fluid is supplied to the channels 44 and the elements 32 take over the weight of the body 22. After that the pressure is increased in the channels 24 and relieved in the channels 36, 28 and 38, whereby the movement of the body 22 is continued in the same direction. By these pressure changes the body 22 can be transported in the desired direction if the carpet is provided with stop elements 40 at both ends. The direction is determined by the elements 30 or 32 being in contact with the body 22 when pressure fluid is supplied to the intermediate channel. In the concept shown in FIG. 3 every element is supported by the adjacent element. Of course it is possible to insert special stop elements (such as the element 40 in FIG. 3) between all elements or between groups of a number of elements. The channels 36 and 44 can suitably be surrounded entirely or partly by non-elastic cord-like and/or other stiffening material 46 which determines the shape of the channels.

In the embodiment of FIG. 3 the channels 36 and 44 are so positioned that the pressure therein only takes up the weight of the body 22, whereas the channels 24 and 28 provide for the displacement of the body 22. It is of course possible to arrange the channels and control the pressures therein so that they simultaneously contribute to supporting as well as displacing the body 22. It is also possible to provide a rod-shaped element with two or more pressure channels so positioned that the element can be displaced in any desired direction In the embodiment of FIG. 3 the elastic elements 30, 32 are forced to extreme positions on both sides of the neutral position of the elements. Hereby maximum movement per cycle is achieved with the least possible strain of the elements. In the cases where only parts of the carpet are brought to work, e.g. the part opposite a load, the support of the first working element can be obtained by keeping the pressure of the channels 24, 28 and 38 between non-working elements constant. A stop element can also be achieved in that one or more of the elements are fixed to support surface 48.

FIG. 4 shows a supporting device according to the invention arranged for circular displacement of a ring body 50. Thereby a motor for slow rotation is obtained. In the embodiment shown the elastic elements 52 and 54 are arranged between rigid flanges 56 connected with a support ring 58. The ring 50 is concentrically supported with respect to the ring 58 by means of the elastic elements 52, 54. For compensating the weight of the ring 50 a higher pressure is supplied to the channels of the elements at the upper section of the device than at the lower sections thereof. By connecting the elements around the periphery into groups which are supplied with pressure independently of each other an arbitrarily directed radial load can be taken up.

If the rings 50 and 58 are rotated relatively to each other by an external torque the pressure channels can be used for liquid transport and thus the device can be used as a pump.

Figure 5:
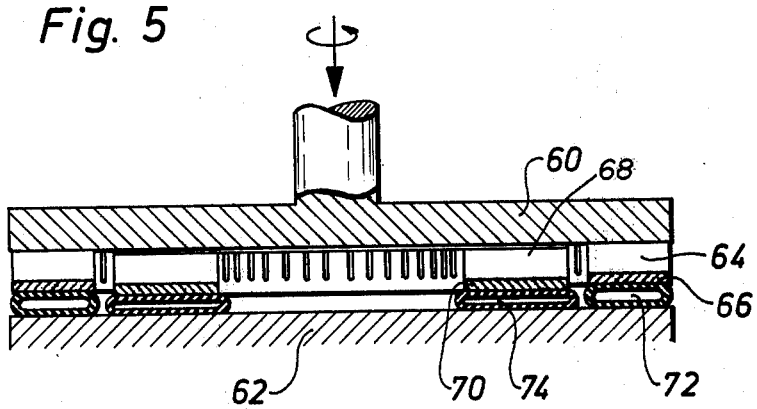
FIG. 5 is a section of a further embodiment of the invention.
Figure 6:
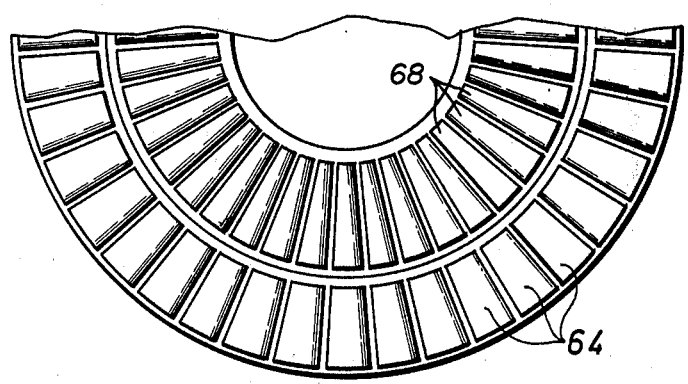
FIG. 6 is a partial plan view of the device of FIG. 5.

FIGS. 5 and 6 show an embodiment of the invention supporting a disc 60 for rotational displacement in relation to a support 62. The elastic elements 64 concurrently taking up the weight of the disc 60 have been connected with a common ring 66. The resting elements 68 have correspondingly been connected with a common ring 70. Thereby the advantage is provided that common channels 72 and 74 for the elements of each ring can be arranged below the rings. Also in this embodiment separate elements or groups of elements can be given a positive traction force by arranging pressure channels at the sides of the elements. The principle shown of connecting the elastic elements with each other can of course be used also in a device for linear displacement.

As shown, the arrangement of FIGS. 5 and 6 operationally correspond to the embodiment of FIGS. 1 and 2, since it requires the exertion of an external force for providing the movement of the body 60. The elements 64 and the elements 68 are alternately raised and lowered in the same manner as the elements 6 and the elements 8 in the embodiment of FIGS. 1 and 2. It should be noted, however, that the elements 64 are connected with each other by means of a common ring 66 and the elements 68 are connected with each other by means of a common ring 70 so that the two groups of elements can be raised and lowered by operating one common channel for each group.

Figure 7:
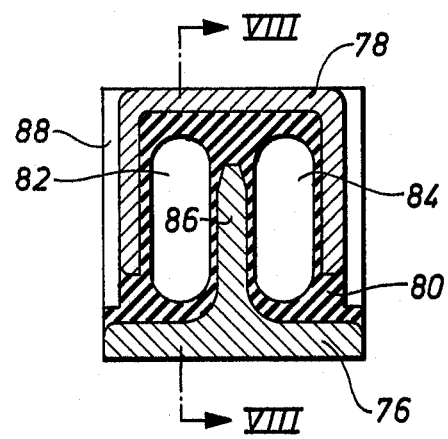
FIG. 7 is cross section of a further embodiment of the invention.
Figure 8:
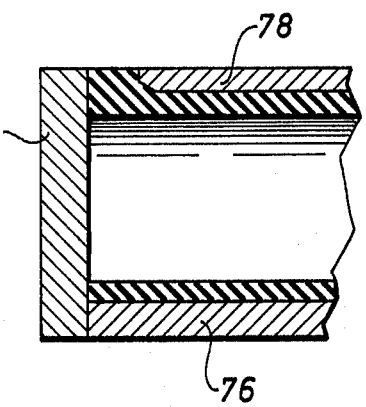
FIG. 8 is an axial section along line 8—8 in FIG. 7.

In FIGS. 7 and 8 there is shown an elastic element of a device according to the invention having in principle the same function as the device shown in FIG. 3. Several elements of this kind are arranged in parallel for constituting a device in accordance with the invention. The element comprises a T-shaped bar 76 and a U-shaped bar 78 connected with each other by means of an elastic body 80. The elastic body 80 defines two parallel chambers 82 and 84 positioned at opposite sides of the web portion 86 of the T-shaped bar 76.

The chambers 82 and 84 are closed by means of end plates 88 connected with the ends of T-shaped rod 76. The ends of the U-shaped rod 78 are spaced from the end plates 88, the elastic body extending into the spaces making the rod 78 elastically displaceable in all directions in relation to the T-shaped rod 76. By means of a pressure fluid supplied to the chambers 82 and 84 it is possible to control the displacement of the rod 78 in relation to the rod 76 for providing the desired displacement of a body supported by elements of the kind shown in FIGS. 7 and 8. The necessary displacements of the rod 78 in relation to the rod 76 are a raising of the rod 78 in relation to the rod 76 and a lateral displacement of the rod 78 in relation to the rod 76 with the opposite surfaces of the rods substantially parallel. By supplying the same amount of fluid to the channels it is possible to raise the rod 78 in relation to the rod 76 and by supplying different amounts of pressure fluid to the chambers it is possible to provide a displacement of the rod 78 parallel with the surface supporting the element. The upper surface of the elements of FIGS. 7 and 8 can be raised to engagement with the supported body by supplying pressure fluid to the chambers 82 and 84, and can be displaced in the lateral direction by supplying more pressure fluid to one of the chambers than to the other. Thus, each of the elements constituting the device can be controlled in the same manner as the elements 30 and 32 of FIG. 3 to displace a supported body. The pressure fluid is supplied to the chambers through lines connected with openings in the end plates 88.

Figure 9:
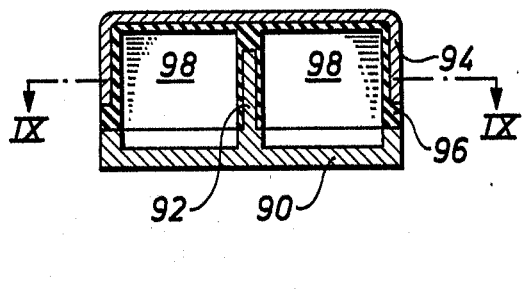
FIG. 9 is a cross section of another embodiment of the invention.
Figure 10:
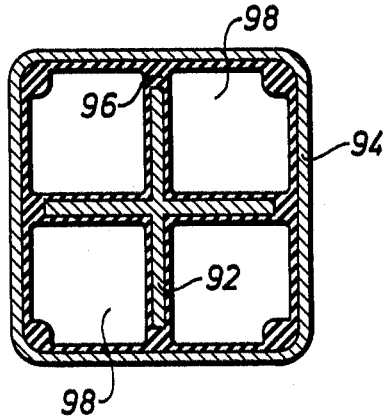
FIG. 10 is a section taken along line 9—9 in FIG. 9.

By means of a supporting device consisting of elements of the type shown in FIGS. 9 and 10 it is possible to displace a body supported by the supporting device in any desired direction parallel with the surface supporting the device. The element consists of a bottom plate 90 having an upwards projecting cross-shaped portion 92 fixedly connected therewith. The element also comprises a cupshaped member 94 connected with the plate and the cross-shaped member by means of an elastic material 96 defining four chambers 98. By controlling the amounts of fluid in the different chambers it is possible to control the displacement of the cup-shaped member 94 in relation to the bottom plate 90 and thereby to displace a body supported by the member 94 in relation to a support surface supporting the element. The embodiment illustrated in FIGS. 9 and 10 can be controlled in the same manner as the embodiment of FIGS. 7 and 8 with the additional feature that the upper surface can be displaced in any direction by supplying to the four chambers different amounts of pressure fluid.

Elements of the kind shown in FIGS. 9 and 10 can be used for supporting a machine. Thereby it is possible to use the elements for dampening vibrations by filling the chambers with a fluid and connecting the chambers with each other by means of small openings. The openings have to be closeable, as the openings must be closed if the elements are to be used for displacing the machine. When the elements are used for displacement each chamber is connected with a hydraulic or pneumatic system with the aid of which the amount of fluid in each chamber is controlled.

The devices shown in FIGS. 1 through 10 have the common feature that the elastic elements are fixed, whereas the body supported by the devices are displaceable. It is of course possible to fix the elastic elements to the body so that the elements are displaced together with the body when this is displaced in relation to a support surface. Also in other respects the device according to the invention can be modified within the scope of the following claims.

I claim:

1. A device for displaceably supporting a body in relation to a support surface comprising at least two elastic elements disposed between the support surface and a surface of the body, said elastic elements being attached to each other only adjacent said support surface and being separately and alternately expansible and contractible in a direction from the support surface toward and from the body, the elastic elements having portions remote from the support surface which are free to move by elastic shearing in the elastic element substantially independent of one another in a direction generally parallel to the support surface, each of said elastic elements having chamber means for alternately expanding and contracting the elastic elements so that the elastic elements will be alternately loaded by and unloaded from the weight of the body, means for urging the body to move in a direction generally parallel to the supporting surface whereby the body may be supported on the remote portions of the elastic elements and displaced substantially parallel to the supporting surface as a result of the elastic shear induced in the elastic element when the elastic element is expanded to support the body and the body is displaced generally parallel to the supporting surface, and pressure fluid means connected to the chamber means for separately and alternately expanding and contracting the elastic elements so that one elastic element will expand to a body supporting position while the other elastic element will contract from the body resuming its original nonexpanded position.

2. A device for displaceably supporting a body as set forth in claim 1 wherein the pressure fluid means further includes means for controlling the supplying of pressure fluid to the chambers and the relief of the pressure therefrom.

3. A device for displaceably supporting a body as set forth in claim 2 including a base member disposed on the support surface and having an upwardly extending projection extending into each elastic element, a top member carried by said elastic element, and said top member being upwardly and laterally displaceable with respect to the base member by expanding and contracting said elastic element when said body is urged to move in a direction parallel to the supporting surface by said urging means.

4. A device for displaceably supporting a body as set forth in claim 3 wherein the top member is provided with downwardly extending flanges.

5. A device for displaceably supporting a body as set forth in claim 3 wherein the upwardly extending projection is in the form of a cross.

6. A device for displaceably supporting a body as set forth in claim 1 including more than two elastic elements.

* * * * *